US008681730B2

(12) United States Patent
Swarts et al.

(10) Patent No.: US 8,681,730 B2
(45) Date of Patent: Mar. 25, 2014

(54) METHOD AND SYSTEM FOR USING SIGN BASED SYNCHRONIZATION SEQUENCES IN A CORRELATION PROCESS TO REDUCE CORRELATION COMPLEXITY IN AN OFDM SYSTEM

(75) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 466 days.

(21) Appl. No.: 12/500,564

(22) Filed: Jul. 9, 2009

(65) Prior Publication Data

US 2011/0007704 A1 Jan. 13, 2011

(51) Int. Cl.
*H04W 4/00* (2009.01)
*H04J 3/00* (2006.01)
*H04J 3/06* (2006.01)

(52) U.S. Cl.
USPC ............................ 370/330; 370/336; 370/350

(58) Field of Classification Search
USPC .......... 370/336, 330, 350; 375/147, 150, 224, 375/343, 152
See application file for complete search history.

(56) References Cited

U.S. PATENT DOCUMENTS

| 6,778,591 B2 * | 8/2004 | Sato .............................. 375/147 |
| 7,522,681 B2 * | 4/2009 | Kohlmann .................... 375/343 |
| 7,664,165 B2 * | 2/2010 | Kang et al. ................... 375/152 |
| 2005/0135464 A1 * | 6/2005 | Lynch et al. ................. 375/150 |
| 2009/0046671 A1 * | 2/2009 | Luo .............................. 370/336 |
| 2011/0129008 A1 * | 6/2011 | Chmiel et al. ................ 375/224 |

FOREIGN PATENT DOCUMENTS

WO WO 2008013404 A1 * 1/2008 ............. H04L 27/26

* cited by examiner

*Primary Examiner* — Mark Rinehart
*Assistant Examiner* — Gbemileke Onamuti
(74) *Attorney, Agent, or Firm* — Sterne, Kessler, Goldstein & Fox PLLC

(57) ABSTRACT

A mobile device receives a signal, from a base station, comprising a primary synchronization signal (PSS) and a secondary synchronization signal (SSS). The received PSS and SSS are used to acquire cell-specific parameters so as to ensure communicates between the mobile device and the base station. The mobile device correlates the received signal in time domain using signs of each of a plurality of correlation reference sequences (reference PSSs). The mobile device generates sign based correlation reference PSSs using signs of the corresponding reference PSSs, which are generated based on a variety of Zadoff-Chu sequences. The received PSS is detected based on the correlation. No multiplication operations are used in the correlation process. Symbol timing is identified according to the detected PSS. The mobile device uses the identified symbol timing to baseband process the received signal. The received signal is an OFDM signal received over a 3GPP LTE/E-UTRA air interface.

22 Claims, 6 Drawing Sheets

METHOD AND SYSTEM FOR USING SIGN BASED SYNCHRONIZATION SEQUENCES IN A CORRELATION PROCESS TO REDUCE CORRELATION COMPLEXITY IN AN OFDM SYSTEM

CROSS-REFERENCE TO RELATED APPLICATIONS/INCORPORATION BY REFERENCE

Not applicable.

FIELD OF THE INVENTION

Certain embodiments of the invention relate to communication systems. More specifically, certain embodiments of the invention relate to a method and system for using sign based synchronization sequences in a correlation process to reduce correlation complexity in an OFDM system.

BACKGROUND OF THE INVENTION

Various communication standards such as Long Term Evolution (LTE) or Evolved Universal Terrestrial Radio Access (E-UTRA) have been developed to offer comparatively high data rates to support high quality services. LTE/E-UTRA is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier—Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area needs to determine one or more cell specific transmission parameters such as, for example, symbol timing, radio frame timing, and/or a cell ID. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as antenna configuration indicator, full physical Cell ID, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for using sign based synchronization sequences in a correlation process to reduce correlation complexity in an OFDM system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using sign based synchronization sequences in a correlation process to reduce correlation complexity in an OFDM system. In various embodiments of the invention, a mobile device is operable to receive signals from a base station. The received signals may comprise a primary synchronization sequence or signal (PSS) and a secondary synchronization sequence or signal (SSS). The received PSS and SSS may be used by the mobile device to acquire cell-specific parameters such as transmission timing, cell ID, and/or antenna configuration associated with transmissions of the base station. The mobile device may be operable to correlate the received signals in the time domain using signs of each of a plurality of correlation reference sequences (reference PSSs). The mobile device may be operable to locally generate the plurality of reference PSSs based on a variety of Zadoff-Chu sequences.

The plurality of sign based reference PSSs may be generated utilizing corresponding signs of real and/or imaginary parts of the plurality of generated reference PSSs. Each of the generated plurality of sign based reference PSSs may be correlated with the received signal for detecting the received PSS. No multiplication operations are used in the correlation process. The correlation process may effectively become a signed or a flipping signed summation process. The mobile device may be operable to detect the received PSS by comparing resulting peak correlation values. The received PSS may correspond to the maximum correlation peak value. The symbol timing may be identified based on a position of the maximum peak. The mobile device may be operable to baseband process the received signal using the identified symbol timing. The received signals may be OFDM signals received over, for example, a 3GPP LTE/E-UTRA air interfaces.

Figure 1:
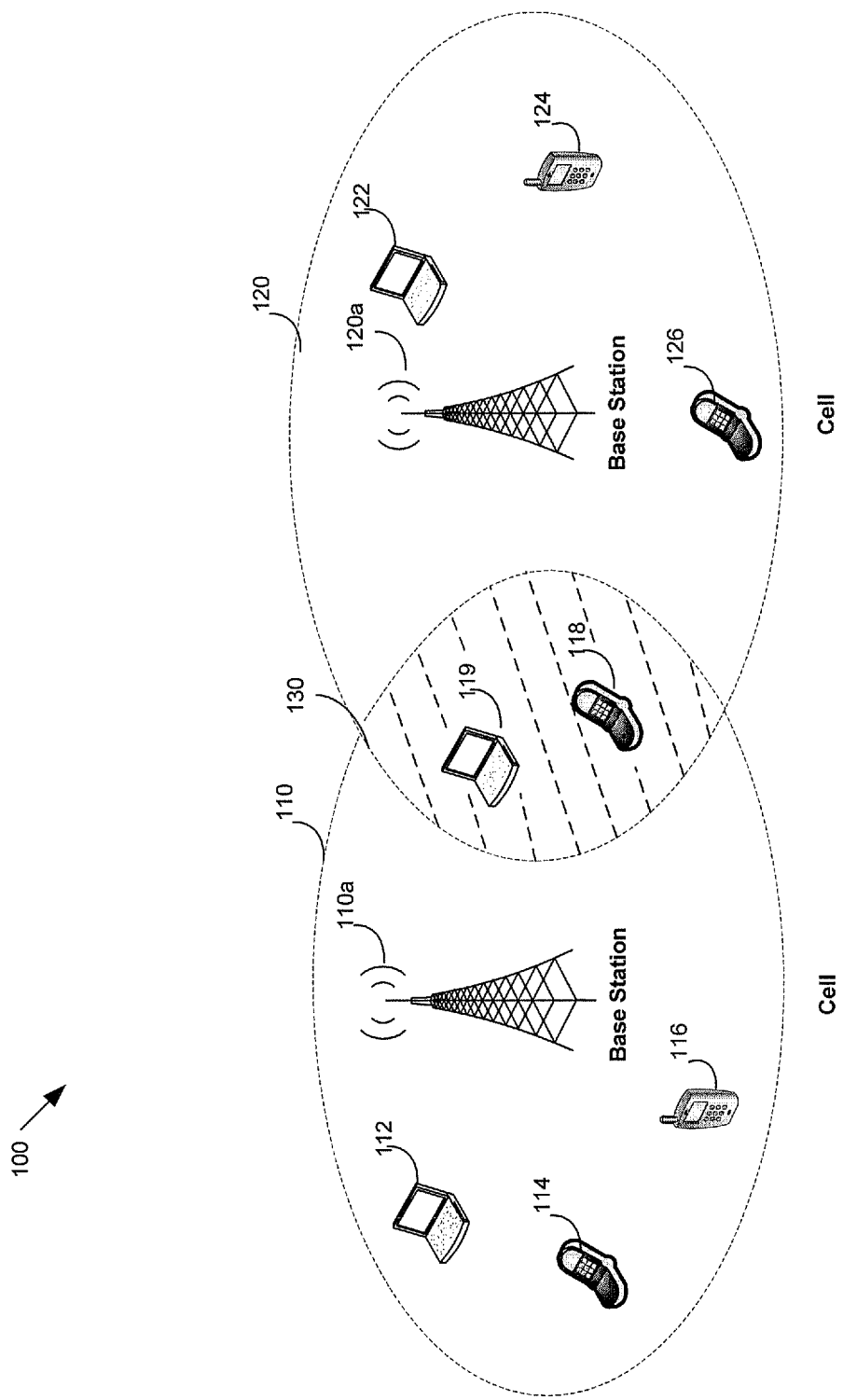
FIG. 1 is a diagram illustrating an exemplary LTE/E-UTRA communication system that is operable to use sign based correlation reference sequences for correlation, in accordance with an embodiment of the invention.

FIG. 1 is a diagram illustrating an exemplary LTE/E-UTRA communication system that is operable to use sign based correlation reference sequences for correlation, in accordance with an embodiment of the invention. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are shown located in the cell 110. The mobile devices 122-126 are shown located in the cell 120. The mobile device 118 and the mobile device 119 are shown located in the overlapped LTE/E-UTRA coverage area 130.

A base station, such as the base station 110a, may comprise suitable logic, circuitry, interfaces and/or code that are operable to manage various aspects of communication, for example, communication connection establishment, connection maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information.

The physical signals, such as synchronization signals, may not carry information from higher layers. In the LTE/E-UTRA standard, the base station 110a may be operable to transmit a primary synchronization signal (PSS) and a secondary synchronization signal (SSS). The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. The SSS is a sequence carrying the information about the cell group, encoded with a scrambling sequence. After successful time and frequency synchronization via the PSS, the frame boundary synchronization and/or the cell identification may be performed. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs are base station or cell specific.

The mobile device 118 may be operable to detect or select a particular PSS from the received plurality of PSSs to acquire PSS synchronization. The selected PSS may be used to estimate a channel. The resulting channel estimates may be utilized to decode the corresponding associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) to correlate or match with each of the received plurality of PSSs, respectively. The mobile device 118 may be operable to compare the resulting correlation peaks to select the particular PSS corresponding to the maximum correlation peak magnitude. The position of the maximum peak magnitude may indicate the starting position of the particular PSS and provide the symbol timing of the corresponding cell such as the cell 110.

In the LTE/E-UTRA standard, a PSS is modulated from a variety of Zadoff-Chu sequences. A Zadoff-Chu sequence is a complex-valued mathematical sequence which may be applied in either the time and/or frequency domain and may be expressed as:

$$x_{k,n} = \begin{cases} e^{\frac{-jk\pi n(n+1)}{L}}, & 0 \le n \le L-1, \quad L \text{ is odd} \\ e^{\frac{-jk\pi n^2}{L}}, & 0 \le n \le L-1, \quad L \text{ is even} \end{cases}$$

where k is the Zadoff-Chu root sequence index, n is the sample index, L is the length of the kth Zadoff-Chu sequence and k is relatively prime to L.

The correlation computation for acquiring PSS synchronization at the mobile device 118 may comprise a plurality of real and imaginary values such as, for example, $Re(x_{k,n})$ and $Im(x_{k,n})$ of the generated correlation reference sequences (candidate PSSs), resulting in multi-bit correlation coefficients in corresponding matched filters or time domain correlators. In order to reduce the correlation complexity, sign based correlation reference sequences may be utilized to perform correlation operations in the time domain correlators required for acquiring PSS synchronization. The sign based correlation reference sequences may comprise signs of real and imaginary parts of the generated correlation reference sequences, which are time domain replicas of the frequency domain mapped Zadoff-Chu sequences. For example, for a complex sequence y, where y={(0.5+j0.5), (−0.5+j0.5), (0.5−j0.5), (1+j0), (0+j), (−1+j0), (0−j), ... } the sign based correlation sequence of the complex sequence y is:

Sign(y)={(1+j1), (−1+j1), (1−j1), (1+j0), (0+j), (−1+j0), (0−j), ... }

The sign based correlation reference sequences such as Sign (y) may be utilized in a correlation process for acquiring PSS synchronization without performing multiplication operations. The correlation process may effectively become a real summation process. In this regard, the correlation coefficients in the correlation process may become single bit valued (1 or −1) and corresponding correlation complexity may be reduced.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. In order to communicate with the base station 110a, a mobile device such as the mobile device 118 may be operable to acquire the transmitted PSS and SSS so as to determine one or more transmission parameters used by base station 110a. For example, the mobile device 118 may be operable to acquire PSS synchronization to identify the symbol timing and estimate a channel. The resulting channel estimates and the identified symbol timing may be used to decode the SSS for frame boundary synchronization and/or cell group information.

In the LTE/E-UTRA standard, the PSS may be generated based on one of three Zadoff-Chu sequences, which are complex-valued sequences mapped to OFDM carriers in the frequency domain. In order to detect or acquire the PSS transmitted by the base station 110a, the mobile device 118 may be operable to generate a plurality of complex-valued correlation reference sequences each to match or correlate with the received signals, respectively. The mobile device 118 may be operable to collect signs of real and imaginary parts of the generated correlation reference sequences to form sign based correlation reference sequences. The mobile device 118 may be operable to utilize the sign based correlation reference sequences in the correlation process so as to reduce correlation complexity. The mobile device 118 may be operable to select the particular PSS with the maximum correlation peak magnitude. The maximum peak magnitude sampling position may indicate the symbol frame timing as well as the PSS used in the corresponding cell such as the cell 110.

Figure 2:
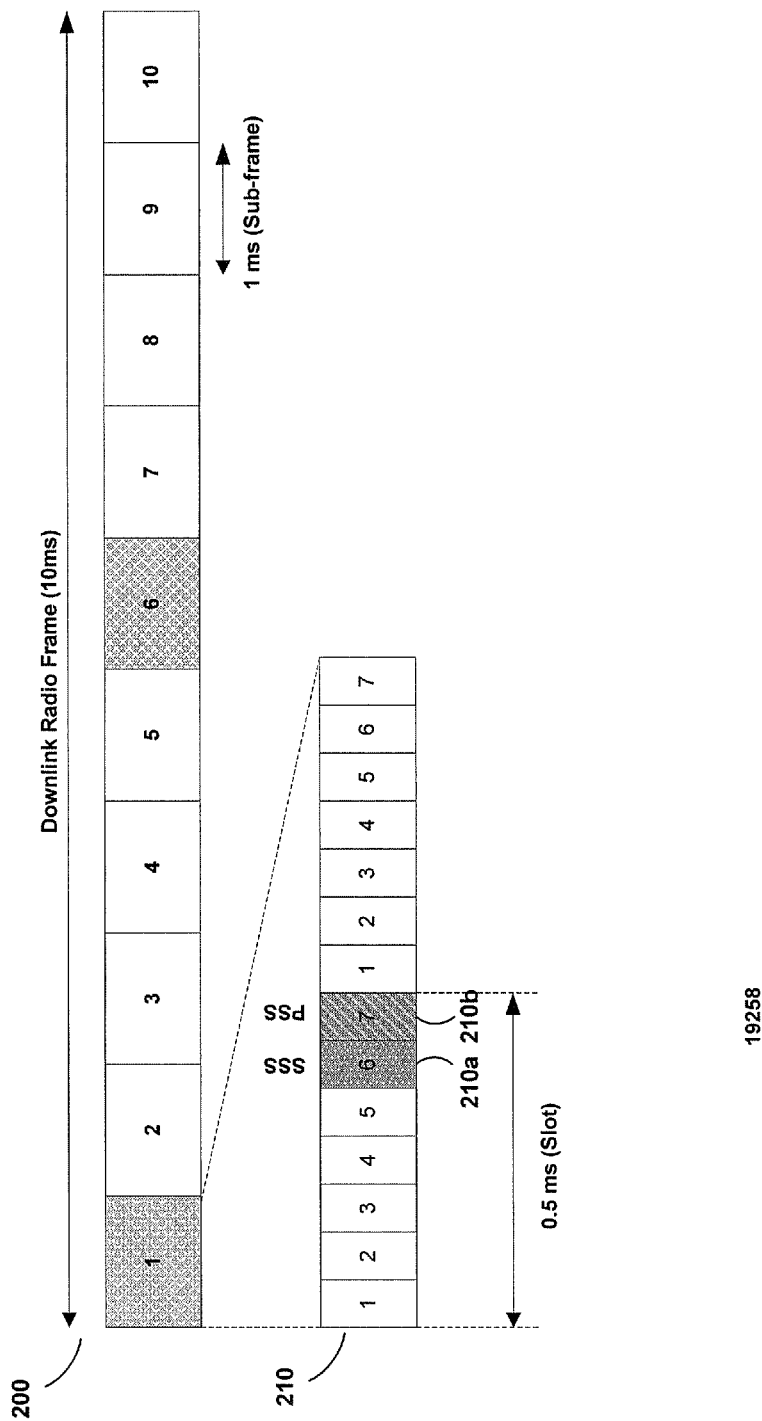
FIG. 2 is a block diagram of an exemplary LTE/E-UTRA downlink synchronization signal structure, in accordance with an embodiment of the invention.

FIG. 2 is a block diagram of an exemplary LTE/E-UTRA downlink synchronization signal structure, in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210a and the SSS 210b may be transmitted on sub-frame 0 and 5 of the downlink radio frame 200 and be contained in two consecutive OFDM symbols in a corresponding sub-frame. The PSS may be used to identify the symbol timing, and the physical layer ID within a cell ID group. The SSS may be used for identifying frame boundary, detecting cell ID group, system parameters such as cyclic prefix (CP) length. Signals in the downlink radio frame 200 may be correlated at the mobile device 118 with a plurality of correlation reference sequences (reference PSSs) to acquire PSS synchronization. The plurality of correlation reference sequences or reference PSSs may be generated locally at the mobile device based on, for example, a variety of Zadoff-Chu sequences. A Zadoff-Chu sequence is a complex-valued sequence, which for the case of LTE/E-UTRA is mapped to the frequency domain. The correlation reference sequences are determined by performing an IFFT on the frequency domain mapped Zadoff-Chu sequence. In this regard, sign based correlation reference sequences or reference PSSs may be utilized in the correlation process for acquiring PSS synchronization so as to reduce correlation complexity in the time domain. The sign based correlation reference sequences or reference PSSs may be formed using signs of real and imaginary parts of corresponding correlation reference sequences or reference PSSs.

Figure 3:
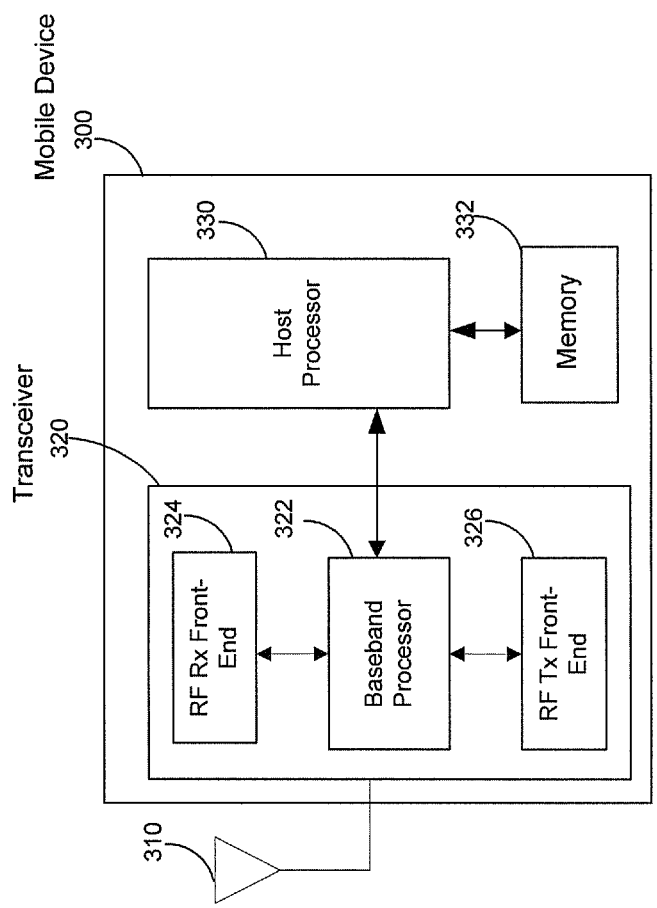
FIG. 3 is a block diagram of an exemplary mobile device that may be operable to use sign based correlation reference sequences in correlation process to reduce correlation complexity, in accordance with an embodiment of the invention.

FIG. 3 is a block diagram of exemplary mobile device that may be operable to use sign based correlation reference sequences in correlation process to reduce correlation complexity, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring PSS synchronization. The generated correlation reference sequences may be derived from, for example, a variety of Zadoff-Chu sequences, which are complex-valued sequences.

The baseband processor 322 may be operable to form sign based correlation reference sequences using signs of real and imaginary parts of the corresponding generated correlation reference sequences. The sign based correlation reference sequences may be utilized in correlation process for acquiring PSS synchronization. In this regard, the baseband processor 322 may be operable to correlate the received baseband signals with each of the sign based correlation reference sequences. The correlation process may be realized using real addition operations without multiplication operations being involved for acquiring PSS synchronization. After a successful PSS synchronization, the baseband processor 322 may be operable to decode corresponding SSS for identifying, for example, frame boundary, cell ID group and system parameters such as cyclic prefix (CP) length so as to communicate with an associated base station.

The host processor 330 may comprise suitable logic, circuitry, interfaces and/or code that may be operable to manipulate and control operation of the transceiver 320. The host processor 130 may be operable to communicate data with the transceiver 320 to support applications such as, for example, audio streaming on the mobile device 300.

The memory 332 may comprise suitable logic, circuitry, interfaces and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 124 may be operable to process RF signals received via the antenna 310 over the LTE/E-UTRA air interface, for example. The received RF signals may comprise PSSs and SSSs transmitted by base stations such as the base station 110a and/or the base station 120a. The received RF signals may be converted to corresponding baseband signals and communicated with the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) based on, for example, Zadoff-Chu sequences. Signs of real and imaginary parts of the generated correlation reference sequences may be used to form sign based correlation reference sequences.

The baseband processor 322 may be operable to correlate the received baseband signals with each of the sign based correlation reference sequences for acquiring PSS synchronization. A particular PSS transmitted by the base station 110a may be detected according to the maximum correlation peak magnitude. Transmission timing such as the symbol timing may be identified according to the position of the maximum correlation peak magnitude. The baseband processor 322 may be operable to utilize the detected PSS and the identified symbol timing to estimate a channel. The resulting channel estimates may be used to decode the corresponding received SSS for identifying frame boundary and cell group information so as to communicate with the base station 110a.

Figure 4:
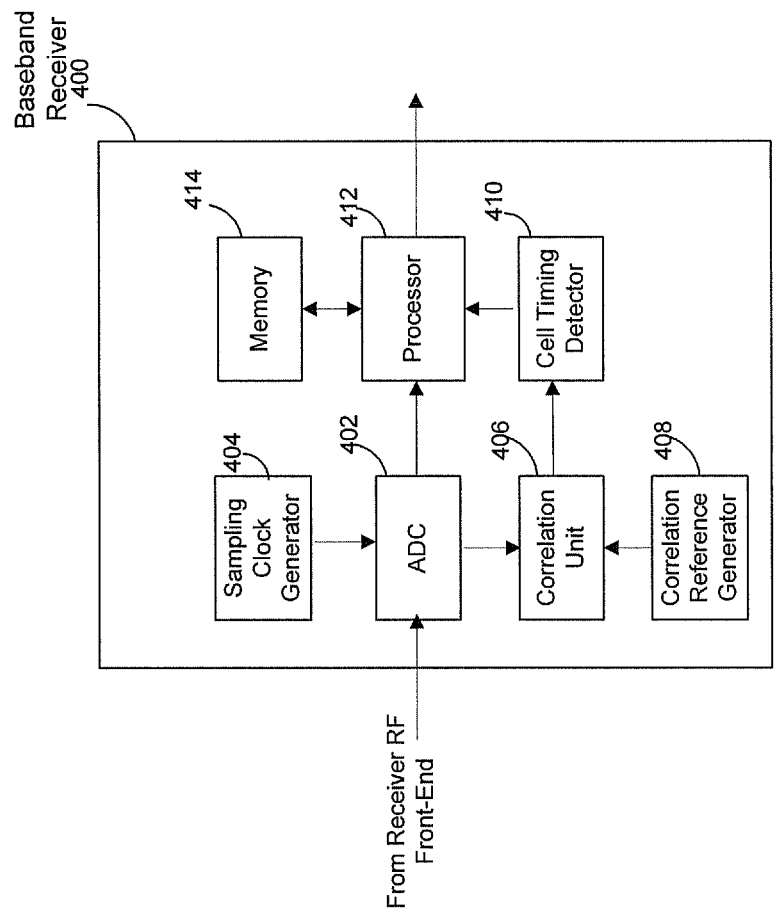
FIG. 4 is a block diagram illustrating an exemplary baseband receiver that is operable to use sign based correlation reference sequences for correlation, in accordance with an embodiment of the invention.

FIG. 4 is a block diagram illustrating an exemplary baseband receiver that is operable to use sign based correlation reference sequences for correlation, in accordance with an embodiment of the invention. Referring to FIG. 4, there is shown a baseband receiver 400. The baseband receiver 400 comprises an analog-to-digital converter (ADC) 402, a sampling clock generator 404, a correlation unit 406, a correlation reference generator 408, a cell timing detector 410, a processor 412 and a memory 414.

The ADC 402 may comprise suitable logic, circuitry, interfaces and/or code that may be operable to convert analog baseband signals received from the RF Rx front-end 324 to corresponding digital baseband signals (e.g., bytes). The ADC 402 may be operable to sample the received analog baseband signals using a sampling clock provided by the sampling clock generator 404. The resulting digital baseband signals comprise values that are representative of the analog baseband signal amplitudes. The digital baseband signals may be communicated with the processor 412 for further baseband processing.

The sampling clock generator 404 may comprise suitable logic, circuitry, interfaces and/or code that may be operable to generate a sampling clock utilized by the ADC 402.

The correlation unit 406 may comprise suitable logic, circuitry, interfaces and/or code that may be operable to perform a correlation process. The correlation unit 406 may be operable to communicate with the correlation reference generator 408 for correlation reference sequences (reference PSSs) for acquiring PSS synchronization. Only signs of real and/or imaginary parts of the correlation reference sequences may be utilized in the correlation process. For example, for the kth reference sequence of $y_k=\{(0.5+j0.5), (-0.5+j0.5), (0.5-j0.5), (1+j0), (0+j), (-1+j0), (0-j), \ldots\}$, where k is the reference sequence index, the sign based sequence $\text{Sign}(y_k)=\{(1+j1), (-1+j1), (1-j1), (1+j0), (0+j), (-1+j0), (0-j), \ldots\}$ is used in the correlation process. The correlation unit 406 may be operable to correlate signals received from the ADC 402 with each of the sign based correlation reference sequences such as $\text{Sign}(y_k)$. The correlation process may be implemented using an addition-only operation. In this regard, the correlation unit 406 may be operable to perform the correlation process using single bit correlation coefficients.

The correlation reference generator 408 may comprise suitable logic, circuitry, interfaces and/or code that may be operable to generate correlation reference sequences (reference PSSs) for the correlation unit 406. The generated correlation reference sequences may be derived based on a variety of Zadoff-Chu sequences. The generated correlation reference sequences are complex-valued mathematical sequences in time domain.

The cell timing detector 410 may comprise suitable logic, circuitry, interfaces and/or code that may be operable to determine transmission timing used in an associated cell according to peak correlation values at the output of the correlation unit 406. The cell timing detector 410 may be operable to detect a particular PSS, which is transmitted by an associated base station, by comparing correlation peak magnitude values at the output of the correlation unit 406. The particular PSS may be detected according to the maximum peak correlation value. The position of the maximum peak magnitude may indicate the starting position of the detected particular PSS and provide transmission timing such as the symbol timing used in the associated cell. The symbol timing may be determined over one slot duration. However, in instances where the signal-to-noise ratio (SNR) is low or when fading is severe, the accuracy of the symbol timing determined based on observations over a single slot may be unreliable. To increase reliability, the symbol timing may be determined using observations over a plurality of slots and the results may then be combined, for example, using non-coherent combining. This may ensure that the correct symbol timing may be identified for transmissions in the associated cell.

The processor 412 may comprise suitable logic, circuitry, interfaces and/or code that may be operable to process digital baseband signals from the ADC 402. The processor 412 may be operable to perform various baseband procedures such as channel estimation, channel equalization, and/or channel decoding using cell transmission timing information provided by the cell timing detector 410. The processed baseband signals may be communicated with associated device host to support corresponding applications.

The memory 414 may comprise suitable logic, circuitry, and/or code that may enable storage of information such as executable instructions and data that may be utilized by the processor 412, the correlation unit 406, and/or the cell timing unit 410. The executable instructions may comprise utilized by various baseband procedures such as channel estimation, channel equalization, and/or channel coding. The executable instructions may comprise algorithms that may be applied to various correlation processes. The memory 414 may comprise RAM, ROM, low latency nonvolatile memory such as flash memory and/or other suitable electronic data storage.

In an exemplary operation, the baseband receiver 400 may be operable to receive analog baseband signals via the ADC 402. The received analog baseband signals may correspond to a RF signal transmitted by the base station 110a, for example. The received analog baseband signals may comprise a PSS and a SSS. The ADC 402 may be operable to convert the received analog baseband signals to corresponding digital baseband signals using a sampling clock provided by the sampling clock generator 404. The resulting digital baseband signals may be communicated with the correlation unit 406 for acquiring PSS synchronization. The correlation unit 406 may be operable to communicate with the correlation reference generator 408 for correlation reference sequences (reference PSSs). The correlation reference generator 408 may be operable to generate or derive the correlation reference sequences based on a variety of Zadoff-Chu sequences. The generated correlation reference sequences are complex-valued sequences in time domain.

The correlation unit 406 may be operable to use signs of corresponding real and imaginary parts of the generated correlation reference sequences for the correlation process. The correlation unit 406 may be operable to communicate resulting correlation values with the cell timing detector 410. The cell timing detector 410 may be operable to select or detect a particular PSS, which is transmitted by the base station 110a, according to the maximum peak correlation value at the output of the correlation unit 406. The position of the maximum peak magnitude may indicate the starting position of the particular PSS and provide the symbol timing used by the base station 110a. The symbol timing information may be communicated to the processor 412. The processor 412 may be operable to process the digital baseband signals using the symbol timing for various baseband applications. For example, the processor 412 may be operable to perform channel decoding on corresponding SSS using the symbol timing for other cell-specific parameters such as, for example, frame boundary and cell group information.

Figure 5:
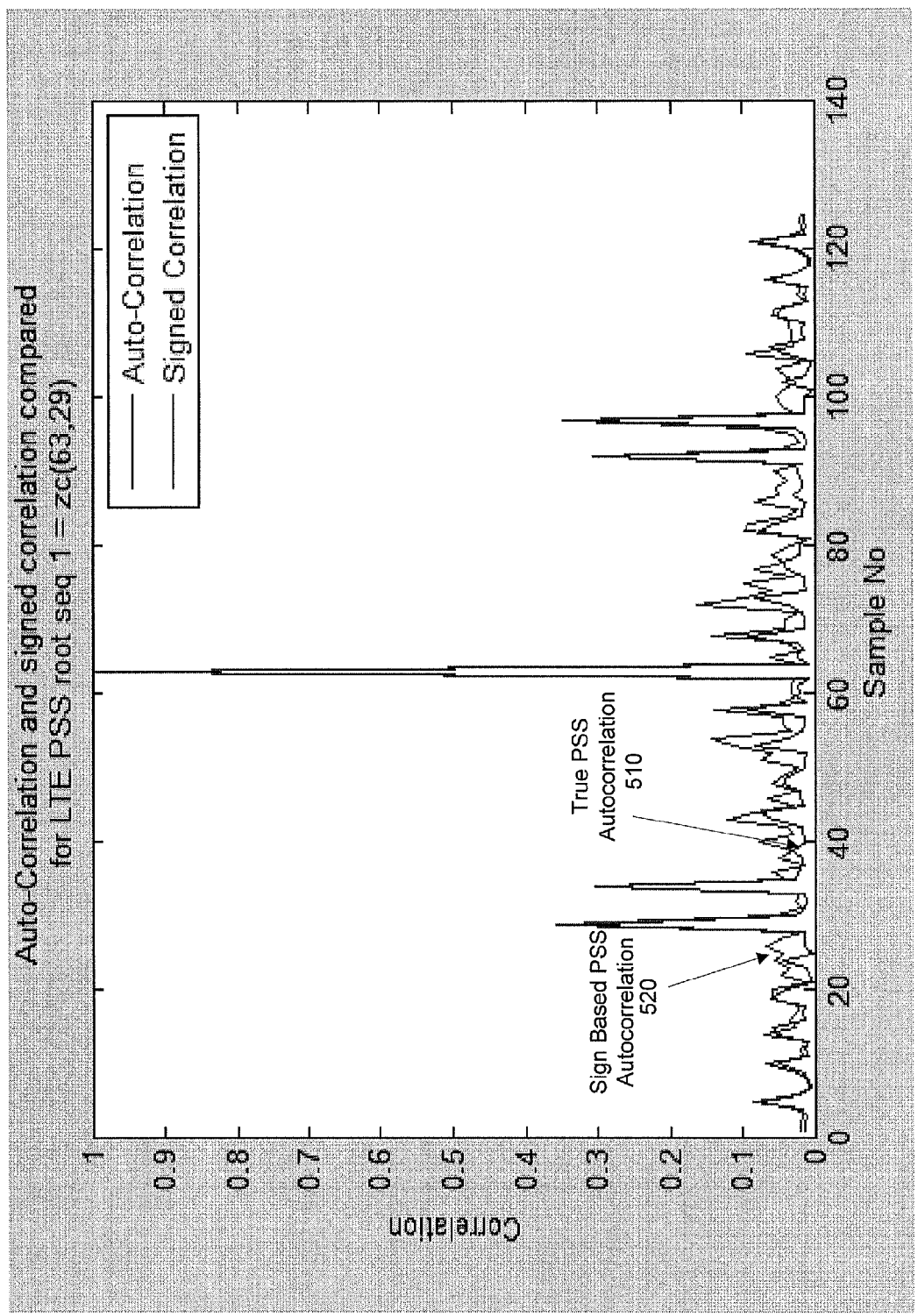
FIG. 5 is illustrating plots of autocorrelation functions in the time domain for an exemplary correlation reference sequence and corresponding sign sequence, respectively, in accordance with an embodiment of the invention.

FIG. 5 is illustrating plots of autocorrelation functions in time domain for an exemplary correlation reference sequence and corresponding sign sequence, respectively, in accordance with an embodiment of the invention. Referring to FIG. 5, there is shown a true PSS autocorrelation plot 510 and a sign based PSS autocorrelation plot 520.

A PSS associated with the true PSS autocorrelation plot 510 is derived from the Zadoff-Chu sequence ZC(63,29). The true PSS autocorrelation plot 510 represents time domain characteristics of autocorrelation function of the PSS. The true PSS correlation plot 510 corresponds to the autocorrelation function of the PSS, which is calculated in time domain using true complex values of the PSS. The sign based PSS correlation plot 520 corresponds to autocorrelation function, which is calculated in time domain using signs of the real and imaginary parts of the corresponding PSS. Referring to FIG. 5, essentially, in time domain, the characteristics of the true PSS autocorrelation plot 510 and the sign based PSS autocorrelation plot 520 look very much the same. No noticeable performance differences in time domain may be observed in the correlation process by using the true PSS and a corresponding sign based PSS correlation reference sequence as a correlation reference sequence, respectively.

Figure 6:
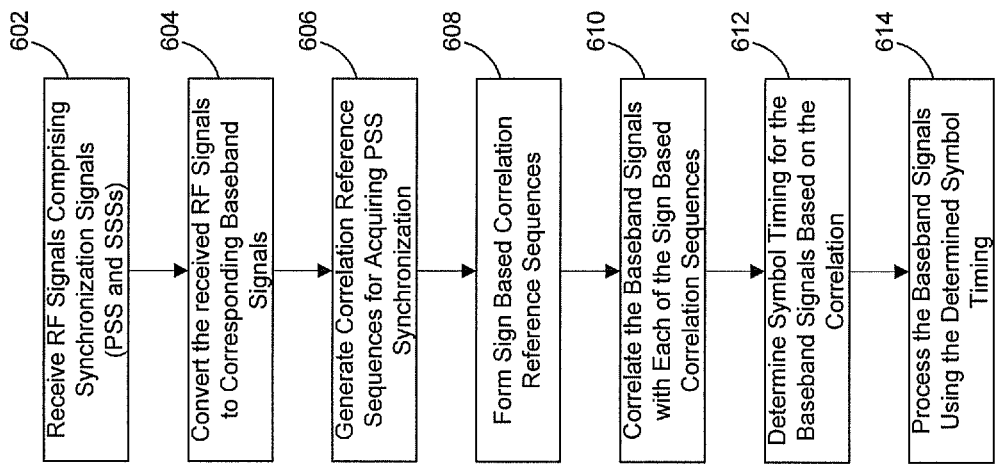
FIG. 6 is a flow chart illustrating an exemplary synchronization procedure that use sign based correlation reference sequences for correlation, in accordance with an embodiment of the invention.

FIG. 6 is a flow chart illustrating an exemplary synchronization procedure that uses sign based correlation reference sequences for correlation, in accordance with an embodiment of the invention. Referring to FIG. 6, the exemplary steps may start with the step 602. In step 602, the RF RX front-end 324 may be operable to receive RF signals over, for example, the LTE/E-UTRA air interfaces. The received RF signals may comprise synchronization signals such as a PSS and a SSS. In step 604, the RF RX front-end 324 may be operable to convert the received RF signals to corresponding baseband signals and communicate with the baseband receiver 400. In step 606, the baseband signals may be converted to corresponding digital baseband signals via the ADC 402. The correlation reference generator 408 may be operable to generate or derive correlation reference sequences (reference PSSs) based on a variety of Zadoff-Chu sequences for acquiring PSS synchronization. In step 608, the correlation unit 406 may be operable to form sign based correlation reference sequences using signs of the real and imaginary parts of the corresponding generated correlation reference sequences. In step 610, the correlation unit 406 may be operable to correlate the digital baseband signals with each of the sign based correlation sequences. The resulting correlation values may be communicated with the cell timing detector 410. In step 612, the cell timing detector 410 may be operable to select or detect a particular PSS, which is transmitted by an associated base station, according to the maximum peak correlation value. The position of the maximum peak correlation magnitude value may indicate the starting position of the particular PSS and provide the symbol timing used by the associated base station. The symbol timing information may be communicated with the processor 412. In step 614, the processor 412 may be operable to process the digital baseband signals using the symbol timing.

In various exemplary aspects of the method and system for using sign based synchronization sequences in a correlation process to reduce correlation complexity in an OFDM system, a mobile device such as the mobile device 114 may be operable to receive a signal from the base station 110a. The received signal may comprise a primary synchronization sequence or signal (PSS) and a secondary synchronization sequence or signal (SSS). The received PSS and SSS may be used by the mobile device 114 to acquire cell-specific parameters such as transmission timing, cell ID, and/or antenna configuration associated with transmissions of the base station 110a. The mobile device 114 may be operable to correlate the received signal in time domain using signs of each of a plurality of correlation reference sequences (reference PSSs). The correlation reference generator 408 may be operable to generate the plurality of reference PSSs based on a variety of Zadoff-Chu sequences. The correlation unit 406 may be operable to generate the plurality of sign based reference PSSs by using corresponding signs of real and/or imaginary parts of the generated plurality of reference PSSs. Each of the generated plurality of sign based reference PSSs may be correlated with the received signal for detecting the received PSS. No multiplication operations are used in the correlation process due to the use of the sign based reference PSS. The correlation process may effectively become a signed or a flipping signed summation process. The received PSS may be detected by comparing resulting peak correlation values at the output of the correlation unit 406. The received PSS may correspond to the maximum correlation peak value. The symbol timing may be identified based on the position of the maximum peak. The processor 412 in the baseband receiver 400 may be operable to baseband process the received signal using the identified symbol timing. The received signal may be an OFDM signal received over, for example, a 3GPP LTE/E-UTRA air interfaces.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for using sign based synchronization sequences in a correlation process to reduce correlation complexity in an OFDM system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of synchronizing with a base station by a mobile device, comprising:
generating a sign-based first complex correlation reference sequence from a second complex correlation reference sequence, each of the sign-based first complex correlation reference sequence and the second complex correlation reference sequence including a plurality of complex coefficients that each have a real component and an imaginary component, the generating the sign-based first complex correlation reference sequence including:
for components of the second complex correlation reference sequence having a positive value assigning a first value to corresponding components in the sign-based first complex correlation reference sequence; and
for components of the second complex correlation reference sequence having a negative value, assigning a second value to corresponding components in the sign-based first complex correlation reference sequence;
receiving a signal from the base station that includes a Primary Synchronization Signal (PSS); and
correlating the PSS of the received signal with the sign-based first complex correlation reference sequence,
wherein at least one of the above steps is performed by a processor.

2. The method of claim 1, wherein results of the correlation include a plurality of peaks.

3. The method of claim 2, further comprising identifying a starting position of the PSS based on a position of a peak having a largest peak magnitude from among the plurality of peaks.

4. The method of claim 2, further comprising identifying symbol timing of a cell corresponding to the base station based on a position of a peak having a largest peak magnitude from among the plurality of peaks.

5. The method of claim 1, wherein the generating of the sign-based first complex correlation reference sequence includes generating the second complex correlation reference sequence.

6. The method of claim 5, wherein the generating of the sign-based first complex correlation reference sequence further includes generating a sequence of complex numbers, from the second complex correlation reference sequence, the real components of the sign-based first complex correlation reference sequence representing only signs of the real components of the second complex correlation reference sequence, and the imaginary components of the sign-based first complex correlation reference sequence representing only signs of the imaginary components of the second complex correlation reference sequence.

7. The method of claim 5, wherein the generating of the sign-based first complex correlation reference sequence further includes generating a sequence of complex numbers that corresponds to the plurality of complex coefficients of the second complex correlation reference sequence,
wherein, for each positively-valued real component of the second complex correlation reference sequence, setting a value of a corresponding real component of the sign-based first complex correlation reference sequence to +1,
wherein, for each negatively-valued real component of the second complex correlation reference sequence, setting a value of a corresponding real component of the sign-based first complex correlation reference sequence to −1, wherein, for each positively-valued imaginary component of the second complex correlation reference sequence, setting a value of a corresponding imaginary component of the sign-based first complex correlation reference sequence to +1, and wherein, for each negatively-valued imaginary component of the second, complex correlation reference sequence, setting a value of a corresponding imaginary component of the sign-based first complex correlation reference sequence to −1.

8. The method according to claim 5, wherein the second complex correlation reference sequence is generated based on at least one Zadoff-Chu sequence.

9. The method according to claim 1, wherein the correlation is a real summation process.

10. The method according to claim 1,
wherein each of the complex coefficients of the sign-based first complex correlation reference sequence are digitally represented by a single bit.

11. A method of synchronizing with a base station by a mobile device, comprising:
generating a complex correlation reference sequence that includes a plurality of complex correlation coefficients, each of the complex correlation coefficients including a real component and an imaginary component;
receiving a signal from the base station that includes a Primary Synchronization Signal (PSS); and
correlating the PSS of the received signal with a sequence of complex sign coefficients, the sequence of complex sign coefficients including a plurality of complex numbers that each include a real component and an imaginary component, the components having a first value when a corresponding component in the complex correlation reference sequence has a positive value and having a second value when a corresponding component in the complex correlation reference sequence has a negative value,
wherein at least one of the above steps is performed by a processor.

12. The method of claim 11, wherein the correlation is a real summation process.

13. The method of claim 11, wherein each of the components of the sequence of complex sign coefficients are digitally represented by a corresponding single bit during the correlation.

14. The method of claim 11, wherein the complex correlation reference sequence is generated based on at least one Zadoff-Chu sequence.

15. A wireless communication device, comprising:
a sequence generator configured to generate a sign-based first complex correlation reference sequence that includes a plurality of sign-based complex coefficients that each include a real component and an imaginary component, from a second complex correlation reference sequence, the components of the sign-based first complex correlation reference sequence having a first value for corresponding positively-valued components of the second complex correlation reference sequence and having a second value for corresponding negatively-valued components of the second complex correlation reference sequence;
a receiver configured to receive a signal from the base station that includes a Primary Synchronization Signal (PSS); and a correlator configured to correlate the PSS of the received signal with the sign-based first complex correlation reference sequence.

16. The wireless communication device of claim 15, wherein the sequence generator is configured to generate the sign-based first complex correlation reference sequence by generating the second complex correlation reference sequence, and
wherein the second complex correlation reference sequence includes complex coefficients that are each represented by a complex number, each complex number having a real component and an imaginary component.

17. The wireless communication device of claim 16, wherein the sequence generator is configured to generate the sign-based first complex correlation reference sequence by generating a sequence of complex numbers from the second complex correlation reference sequence, the real components of the first complex correlation reference sequence representing only signs of the real components of the real components of the complex coefficients of the second complex correlation reference sequence, and the imaginary components of the first complex correlation reference sequence representing only signs of the imaginary components of the complex coefficients of the second complex coefficient correlation reference sequence.

18. The wireless communication device of claims 16, wherein the sequence generator is configured to generate the sign-based first complex correlation reference sequence by generating a sequence of complex numbers that corresponds to the plurality of complex coefficients of the second complex correlation reference sequence,
wherein, for each positively-valued real component of the second complex correlation reference sequence, the sequence generator is configured to set a value of a corresponding real component of the sign-based first complex correlation reference sequence to +1,
wherein, for each negatively-valued real component of the second complex correlation reference sequence, the sequence generator is configured to set a value of a corresponding real component of the sign-based first complex correlation reference sequence to −1,
wherein, for each positively-valued valued imaginary component of the second complex correlation reference sequence, the sequence generator is configured to set a value of a corresponding imaginary component of the sign-based first complex correlation reference sequence to +1, and
wherein, for each negatively-valued imaginary component of the second complex correlation reference sequence, the sequence generator is configured to set a value of a corresponding imaginary component of the sign-based first complex correlation reference sequence to −1.

19. The wireless communication device according to claim 15, wherein the correlation is a real summation process.

20. The wireless communication device according to claim 15, wherein each of the correlation coefficients are digitally represented by a single bit.

21. A method of synchronizing with a base station by a mobile device, comprising:
generating a sign-based first complex correlation reference sequence corresponding to signs of a second complex correlation reference sequence;
receiving a signal from the base station that includes a Primary Synchronization Signal (PSS); and
correlating the PSS of the received signal with the sign-based first complex correlation reference sequence, wherein at least one of the above steps is performed by a processor, wherein the generating of the sign-based first complex correlation reference sequence further includes generating a sequence of complex numbers that corresponds to a plurality of complex coefficients of the second complex correlation reference sequence, wherein the generating further includes, for each positively-valued real component of the second complex correlation reference sequence, setting a value of a corresponding real component of the sign-based first complex correlation reference sequence to +1, and wherein the generating further includes, for each negatively-valued real component of the second complex correlation reference sequence, setting a value of a corresponding real component of the sign-based first complex correlation reference sequence to −1.

22. The method of claim 21, wherein the generating further includes, for each positively-valued imaginary component of the second complex correlation reference sequence, setting a value of a corresponding imaginary component of the sign-based first complex correlation reference sequence to +1, and wherein the generating further includes, for each negatively-valued imaginary component of the second complex correlation reference sequence, setting a value of a corresponding imaginary component of the sign-based first complex correlation reference sequence to −1.

* * * * *

UNITED STATES PATENT AND TRADEMARK OFFICE
CERTIFICATE OF CORRECTION

PATENT NO.        : 8,681,730 B2                                     Page 1 of 1
APPLICATION NO.   : 12/500564
DATED             : March 25, 2014
INVENTOR(S)       : Swarts et al.

It is certified that error appears in the above-identified patent and that said Letters Patent is hereby corrected as shown below:

In the Claims:

Column 14, line 27, replace "device of claims 16" with -- device of claim 16 --

Signed and Sealed this
Seventeenth Day of June, 2014

Michelle K. Lee
*Deputy Director of the United States Patent and Trademark Office*